United States Patent
Zhang et al.

(10) Patent No.: US 10,728,928 B2
(45) Date of Patent: Jul. 28, 2020

(54) RANDOM BACKOFF PROCESS FOR SPATIAL LISTEN-BEFORE-TALK (LBT)

(71) Applicant: QUALCOMM Incorporated, San Diego, CA (US)

(72) Inventors: Xiaoxia Zhang, San Diego, CA (US); Taesang Yoo, San Diego, CA (US); Siddhartha Mallik, San Diego, CA (US); Aleksandar Damnjanovic, Del Mar, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 16/129,473

(22) Filed: Sep. 12, 2018

(65) Prior Publication Data

US 2019/0110317 A1   Apr. 11, 2019

Related U.S. Application Data

(60) Provisional application No. 62/571,027, filed on Oct. 11, 2017.

(51) Int. Cl.
*H04W 4/00* (2018.01)
*H04W 74/08* (2009.01)
*H04W 72/04* (2009.01)

(52) U.S. Cl.
CPC ...... *H04W 74/0808* (2013.01); *H04W 72/046* (2013.01)

(58) Field of Classification Search
CPC ........... H04W 74/0808; H04W 72/046; H04W 74/0816; H04W 72/12; H04W 72/14;
(Continued)

(56) References Cited

U.S. PATENT DOCUMENTS

2006/0291402 A1* 12/2006 Yun .................... H04W 74/0816
370/252
2008/0268785 A1* 10/2008 McCoy ................ H04B 7/0417
455/67.11
(Continued)

FOREIGN PATENT DOCUMENTS

WO   WO-2014210401 A2   12/2014
WO   WO-2016015650 A1   2/2016

OTHER PUBLICATIONS

International Search Report and Written Opinion—PCT/US2018/050929—ISA/EPO Dec. 11, 2018.

*Primary Examiner* — Stephen M D Agosta
(74) *Attorney, Agent, or Firm* — Liem T. Do

(57) ABSTRACT

Wireless communications systems and methods related to performing random backoff over multiple spatial dimensions in spatial listen-before-talk (LBT) procedures are provided. A first wireless communication device determines a first backoff counter for contending for a transmission opportunity (TXOP) in a communication medium over a first spatial subspace. The first wireless communication device detects a transmission in the TXOP within the first spatial subspace. The first wireless communication device determines a second backoff counter for contending for the TXOP over a second spatial subspace that is different from the first spatial subspace based on the detecting. The second spatial subspace is part of the first spatial subspace and the detected transmission is in a different spatial subspace than the second spatial subspace.

27 Claims, 10 Drawing Sheets

(58) Field of Classification Search
CPC ..... H04W 84/12; H04W 16/14; H04W 72/04; H04W 16/28; H04W 24/10; H04W 28/0221; H04W 28/0247; H04W 28/06; H04W 36/06; H04W 36/30; H04W 36/38; H04W 4/70; H04W 52/0229; H04L 45/60; H04L 49/103; H04L 49/15; H04L 49/254; H04L 5/0055; H04L 27/26; H04L 1/00; H04L 1/0061; H04L 27/2602; H04L 27/2607; H04L 41/0233; H04L 41/0803; H04L 5/0007

See application file for complete search history.

(56) References Cited

U.S. PATENT DOCUMENTS

| | | | |
|---|---|---|---|
| 2011/0134876 A1* | 6/2011 | Takada | H04W 72/0406 370/329 |
| 2015/0201434 A1* | 7/2015 | Fang | H04W 74/0816 370/335 |
| 2017/0118725 A1 | 4/2017 | Chu et al. | |
| 2017/0134989 A1* | 5/2017 | Hirsch | H04W 28/26 |
| 2017/0171887 A1 | 6/2017 | Shi et al. | |
| 2017/0188364 A1* | 6/2017 | Li | H04W 24/02 |

* cited by examiner

RANDOM BACKOFF PROCESS FOR SPATIAL LISTEN-BEFORE-TALK (LBT)

CROSS REFERENCE TO RELATED APPLICATIONS

The present application claims priority to and the benefit of the U.S. Provisional Patent Application No. 62/571,027, filed Oct. 11, 2017, which is hereby incorporated by reference in its entirety.

TECHNICAL FIELD

This application relates to wireless communication systems, and more particularly to performing random backoff for medium sharing in a spatial domain.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

One approach to avoiding collisions when communicating in a shared communication medium or a shared channel is to use a listen-before-talk (LBT) procedure to ensure that the shared channel is clear before transmitting a signal in the shared channel. When nodes include multiple antennas, medium sharing can include a spatial dimension in addition to time and/or frequency sharing. For example, a node can transmit a reservation for a transmission opportunity (TXOP) in a shared channel and indicate a spatial dimension (e.g., one or more spatial layers or spatial directions) to be used during the TXOP in the reservation. Thus, other nodes may share the medium in a spatial domain. For example, a node may detect an ongoing transmission (e.g., the reservation) in a particular spatial layer or spatial direction and may overlay a transmission on top of the ongoing transmission using unreserved spatial layers or unreserved spatial directions.

Random backoff is commonly used to resolve contention among nodes acquiring or contending for channel access. For example, each node may perform a random backoff process to wait for a period of time before attempting to contend for the channel, after detecting an ongoing transmission in the channel, and/or or after gaining access to transmit in the channel. The configuration of the random backoff process can affect medium sharing performance and fairness of the sharing among nodes.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first wireless communication device, a first backoff counter for contending for a transmission opportunity (TXOP) in a communication medium over a first spatial subspace; detecting, by the first wireless communication device, a transmission in the TXOP within the first spatial subspace; and determining, by the first wireless communication device, a second backoff counter for contending for the TXOP over a second spatial subspace that is different from the first spatial subspace based on the detecting, In an additional aspect of the disclosure, an apparatus includes a processor configured to determine a first backoff counter for contending for a transmission opportunity (TXOP) in a communication medium over a first spatial subspace; detect a transmission in the TXOP within the first spatial subspace; and determine a second backoff counter for contending for the TXOP over a second spatial subspace that is different from the first spatial subspace based on the detecting.

In an additional aspect of the disclosure, a computer-readable medium having program code recorded thereon, the program code includes code for causing a first wireless communication device to determine a first backoff counter for contending for a transmission opportunity (TXOP) in a communication medium over a first spatial subspace; code for causing the first wireless communication device to detect a transmission in the TXOP within the first spatial subspace; and code for causing the first wireless communication device to determine a second backoff counter for contending for the TXOP over a second spatial subspace that is different from the first spatial subspace based on the detecting.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
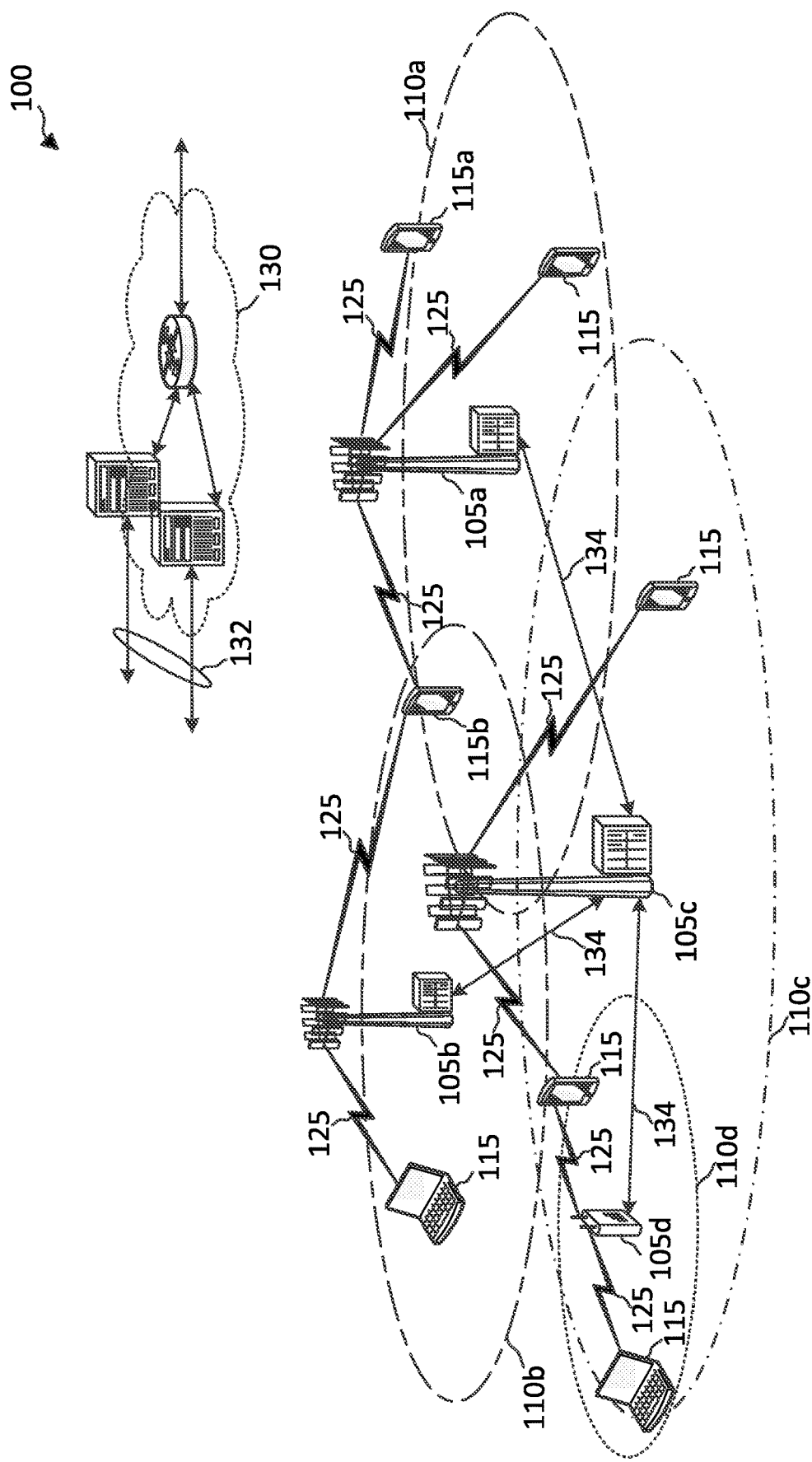
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for performing random backoff in multiple spatial dimensions for medium sharing in a spatial domain. To perform a spatial LBT procedure, a node may determine a first backoff counter for contending for a transmission opportunity (TXOP) in a communication medium over a first spatial subspace or spatial dimension. For example, the node may draw a backoff value for the first backoff counter based on a contention window. When the first backoff counter counts to completion, the node may transmit in the communication medium within the first spatial subspace. After transmitting in the first spatial subspace, the node may draw another backoff value for contending for a subsequent TXOP. However, upon detecting an ongoing transmission (e.g., a reservation for the TXOP) within the first spatial subspace, the node may switch to contend in a second spatial subspace. The second spatial subspace may be a part of the first spatial subspace, but excluding a spatial subspace used by the ongoing transmission. The node may determine a second backoff counter for contending in the second spatial subspace. Upon a successful contention, the node may spatially overlay a transmission on top of the ongoing transmission in the TXOP. The determination of the second backoff counter may be dependent on whether the node uses a single random backoff process or multiple random backoff processes across different spatial dimensions.

In an embodiment, the node may use a single random backoff process across multiple subspace. The node may assign the second backoff counter with a value of the first backoff counter at the time when the ongoing transmission is detected. In other words, the node continues with the counting in the same backoff process when switching to a different spatial subspace. For a subsequent TXOP, the node may return to contend in the first spatial subspace. When the node successfully contends in a current TXOP (e.g., transmitting in any spatial subspace), the node may redraw a new backoff value for the subsequent TXOP. However, when the node fails to gain access to the communication medium in any spatial subspace in a current TXOP, the node may continue with the counting for the subsequent TXOP.

In an embodiment, the node may use multiple random backoff processes. Upon the detection of the ongoing transmission, the node may store a current value of the first backoff counter. The node may assign the second backoff counter with the current value of the first backoff counter. For a subsequent TXOP, the node may return to contend in the first spatial subspace. The node may use the stored value for random backoff regardless of whether the node can overlay a transmission in a current TXOP. The random backoff process for contending in the first spatial subspace may be referred to as a parent process. The random backoff process for contending in the second spatial subspace (e.g., a subspace of the first spatial subspace) may be referred to as a child process The node may maintain different random backoff processes for different spatial subspaces, but a child random backoff process is dependent on a corresponding parent random backoff process.

In another embodiment, the node may use multiple random backoff processes, but may draw a new backoff value for the second backoff counter based on a contention window. The node may store a current value of the first backoff counter at the time when the ongoing transmission is detected. For a subsequent TXOP, the node may return to contend in the first spatial subspace using the stored value for random backoff regardless of whether the node can overlay a transmission in a current TXOP. In other words, the node may maintain different random backoff processes for different spatial subspaces, where a child random backoff process may be independent from a corresponding parent backoff process.

While the disclosed embodiments describe random backoff using a count-down process, random backoff may be alternatively configured to use a count-up process to achieve similar functionalities. The disclosed embodiments may use the terms spatial subspace, spatial dimension, spatial direction, and spatial layers interchangeably to refer to a physical direction of a transmission beam or a reception beam in a spatial domain.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. The BSs 105 and the UEs 115 may be operated by multiple network operating entities sharing resources in the shared channel. A BS 105 or a UE 115 may reserve a transmission opportunity (TXOP) in the shared channel by transmitting a reservation request signal prior to transmitting data in the TXOP. A corresponding receiver (e.g., a BS 105 or a UE 115) may respond by transmitting a reservation response signal. To avoid collisions, other BSs 105 and/or other UEs 115 may listen to the channel and refrain from accessing the channel during the TXOP upon detection of the reservation request signal and/or the reservation response signal. For example, a node intending to transmit in the shared channel may start a countdown process using a random counter. When the countdown is completed, the node may listen to the shared channel. When the shared channel is not occupied, the node may begin its transmission.

In an embodiment, the network 100 may perform medium sharing over a spatial domain to further increase medium or channel utilization efficiency. For example, the BSs 105 and/or the UEs 115 may be equipped with multiple antennas (e.g., antenna arrays) and may form beams in particular spatial directions for signal transmissions and receptions. To enable spatial sharing, a reserving node (e.g., a BS 105 or a UE 115) may indicate spatial layer or spatial dimension information in a reservation for a TXOP. Other nodes may listen to the channel. The other nodes may detect the reservation, for example, by measuring signal energy in the spatial domain, and may use remaining spatial layers, dimensions, or directions during the TXOP. In other words, nodes in the network 100 may perform spatial LBT and overlay a transmission on top of an ongoing transmission in a spatial domain by using a spatial subspace orthogonal to the spatial subspace of the ongoing transmission.

The nodes may perform a random backoff countdown process before contending for the channel. In an embodiment, a node may use a single random backoff countdown process for all spatial subspaces, for example, irrespective of a change in a spatial subspace during spatial LBT. In another embodiment, a node may use different random backoff countdown processes for different subspaces during spatial LBT. The different random backoff countdown processes may be based on the same contention window or different contention windows and may be dependent or independent of each other. Mechanisms for performing random backoff in spatial LBT are described in greater detail herein.

Figure 2:
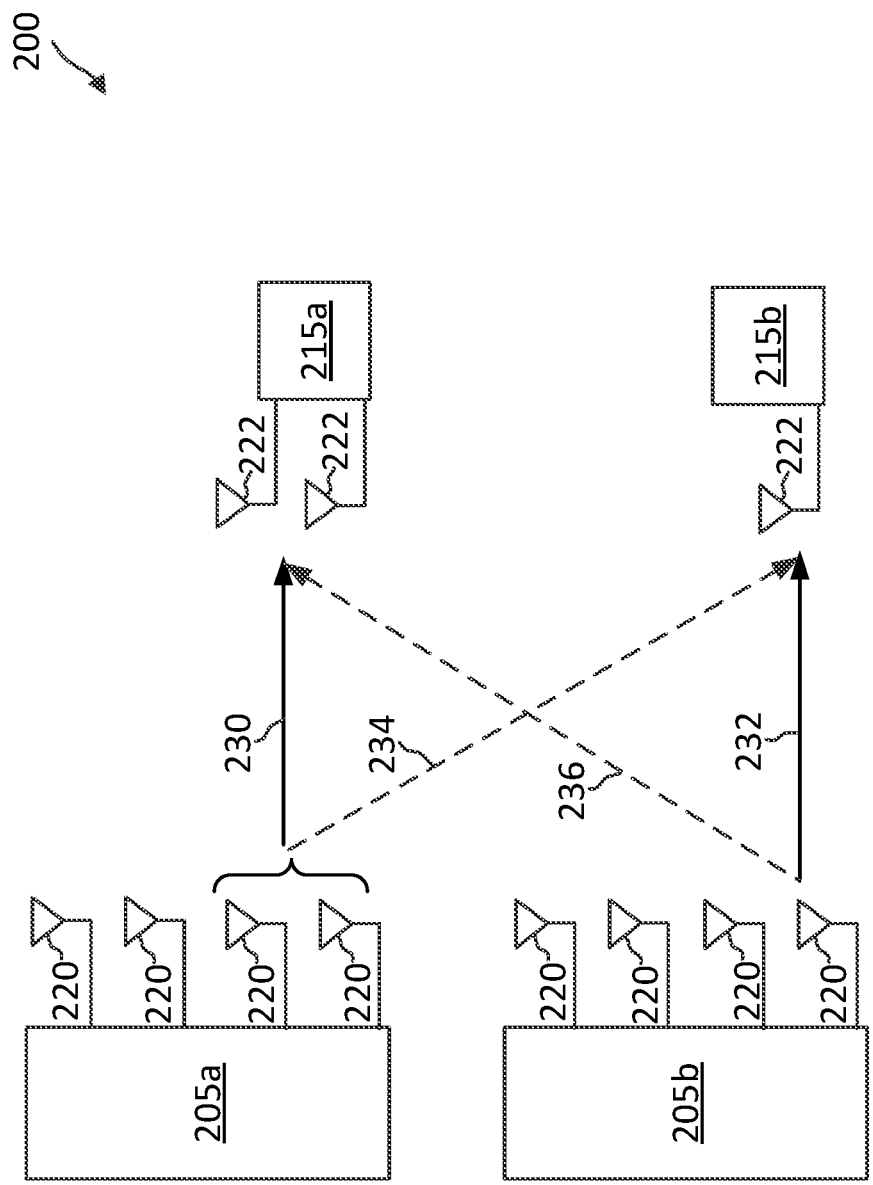
FIG. 2 illustrates a wireless communication network that implements medium sharing in a spatial domain according to embodiments of the present disclosure.

FIG. 2 illustrates a wireless communication network 200 that implements medium sharing in a spatial domain according to embodiments of the present disclosure. The network 200 corresponds to a portion of the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The network 200 may be operated by multiple operators sharing a frequency spectrum. For example, Operator A may operate the BS 205a and the UE 215a, and Operator B may operate the BS 205b and the UE 215b. In addition, FIG. 2 illustrates each BS 205 including four transmit antennas 220, the UE 215a including two receive antennas 222, and the UE 215b including one receive antenna 222 for purposes of simplicity of discussion, though it will be recognized that embodiments of the present disclosure may scale to any suitable number of transmit antennas and/or receive antennas at the BSs 205 and/or the UEs 215. For example, a BS 205 or a UE 215 may include an antenna array including between 1 and 64 antennas.

The BS 205a having four transmit antennas 220 can support up to a transmission rank of four or four spatial layers. The BS 205a may employ single-input single-output (SISO), single-input multiple-output (SIMO), multiple-input single-output (MISO), or multiple-input multiple-output (MIMO) type pre-coding techniques to communicate with the UE 215a over a number of the spatial layers. The BS 205a may communicate with the UE 215a using a subset or all of the transmit antennas 220. For example, the BS 205a may communicate with the UE 215a using two antennas 220 as shown by the link 230, which may be referred to as a 2×2 link.

Similarly the BS 205b having four transmit antennas 220 can support up to a transmission rank of four or four spatial layers. Since the UE 215b includes one antenna 222, the BS may communicate with the UE 215b using one transmit antenna 220 to form 1×1 link (e.g., single-input single-output (SISO)) or using two transmit antennas to form a 2×1 link (e.g., a MISO).

As an example, the BS 205 and the UE 215 operate over a shared channel and both the BS 205a and the BS 205b have data to transmit to the UE 215a and the UE 215b, respectively. Both the BS 205a and the BS 205b may start a countdown process before transmissions. To perform a countdown process, the BS 205a or the BS 205b may draw an integer value, for example, from a uniform distributor, over an interval between 1 and a contention window size (e.g., corresponding to a time period) and configure a counter or a timer with the selected value. A countdown process is completed when the counter counts to completion or when the timer expires. For example, the BS 205b completes the countdown process before the BS 205a, and thus may gain access to the shared channel. For example, the BS 205b may transmit a reservation request (RRQ) signal to indicate a reservation for a TXOP to communicate with the UE 215b. The UE 215b may respond with a reservation response (RRS) signal (e.g., a clear-to-send (CTS) signal). Subsequently, the BS 205b may communicate data with the UE 215b during the TXOP, for example, over one spatial layer as shown by the link 232. When the BS 205a is physically positioned close to the UE 215b, the BS 205a may detect the ongoing transmission from the BS 205b to the UE 215b.

When employing medium sharing over time and frequency only, the BS 205a may refrain from communicating with the UE 215a upon the detection in order to avoid causing interference to the reception at the UE 215b (e.g., over the cross link 234). However, when the BS 205a performs spatial LBT, the BS 205a may detect or identify a spatial direction of the cross link 234 between the BS 205a and the UE 215b based on the RRS or CTS transmission of the UE 215b. In some embodiments, the UE 215b may pre-code the RRS or CTS transmission based on a DL pre-coded channel (e.g., estimated from a transmission of the BS 205b) and an observed interference covariance on the UE 215b. After identifying the spatial direction over the cross link 234, the BS 205b may identify spatial layers that are orthogonal or pseudo-orthogonal to the spatial direction over the cross link 234 from the BS 205a to the UE 215b. Thus, the BS 205a may communicate with the UE 215a using the identified spatial layers without introducing significant interference to the reception of the ongoing transmission at the UE 215b.

The BS 205a may perform a second countdown process in a spatial subspace including the identified spatial layers before communicating with the UE 215a. For example, after the second countdown process, the BS 205a may use two transmit antennas 220 to communicate with the UE 215a over the link 230 as shown. The BS 205a may perform beamforming to direct the transmission to a spatial direction orthogonal or pseudo-orthogonal to the spatial direction over the cross link 234 between the BS 205a and the UE 215b. Thus, a transmission of the BS 205a may cause a minimal interference to the UE 215b over the cross link 234. In addition, the BS 205a may schedule a DL transmission to UE 215a such that the UE 215a may experience a minimal interference from the ongoing transmission of the BS 205b over the cross link 236. The two countdown processes may be configured based on the same contention window or different contention windows and may be dependent or independent from each other, as described in greater detail herein.

Figure 3:
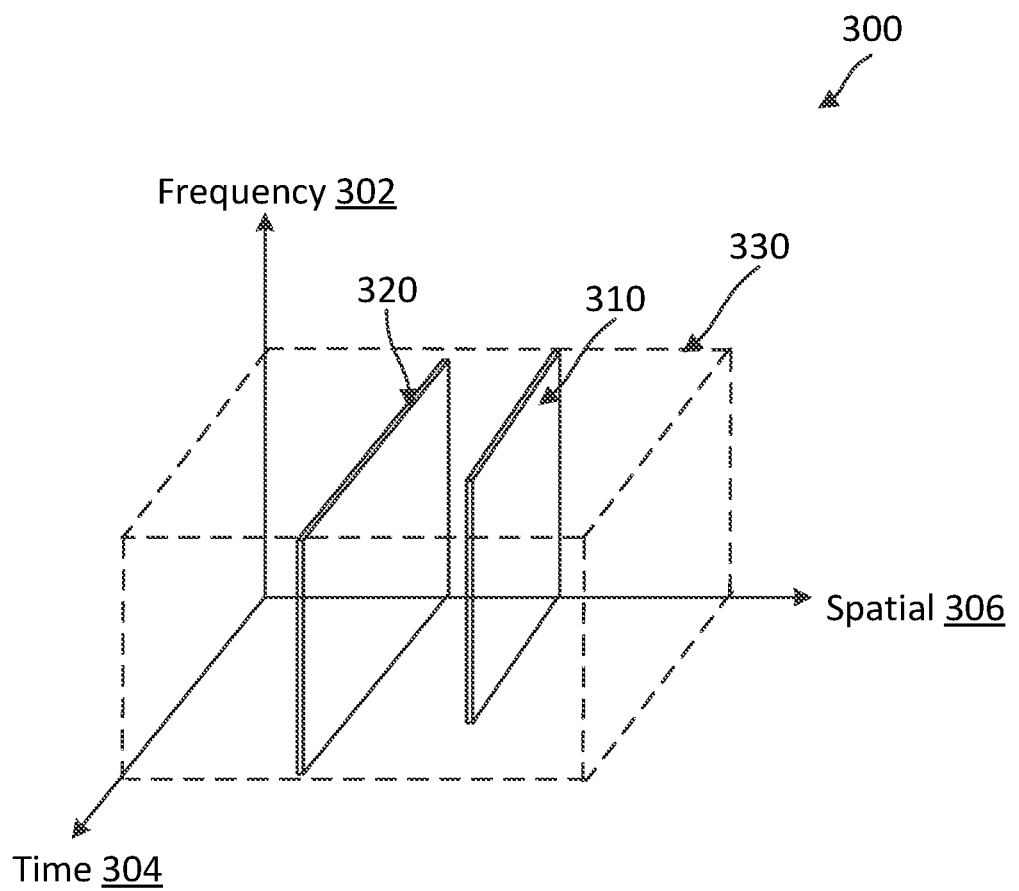
FIG. 3 illustrates a medium sharing scheme according to embodiments of the present disclosure.

FIG. 3 illustrates a medium sharing scheme 300 according to embodiments of the present disclosure. The scheme 300 may be employed by the BSs 105 and 205 and the UEs 115 and 215. The scheme 300 illustrates medium sharing in a spatial domain. For example, in addition to a frequency dimension 302 and a time dimension 304, the scheme 300 includes a spatial dimension 306. FIG. 3 illustrates two spatial subspaces 310 and 320 within a spatial subspace 330 for purposes of simplicity of discussion, though it will be recognized that embodiments of the present disclosure may scale to many more spatial subspaces 310 and 320 within the spatial subspace 330 and the spatial subspaces may span in any suitable manner in the frequency dimension 302, the time dimension 304, and the spatial dimension 306. The spatial subspaces 310, 320, and 330 may also be referred to as spatial channels. In some embodiments, the spatial subspace 330 may correspond to an omnidirectional dimension. As shown, the spatial subspaces 310 and 320 have different spatial dimensions (e.g., occupying different spaces in the spatial dimension 306). Thus, cross-channel interference between the spatial subspaces 310 and 320 may be minimal or zero.

For example, the BS 205a may begin spatial LBT in the spatial subspace 330 and detect the cross link channel between BS 205a to UE 215b over the link 234 corresponding to the spatial subspace 310. Upon the detection, the BS 205a may switch to perform spatial LBT in a second subspace. The second spatial subspace may be a part of the spatial subspace 330, but excluding the spatial subspace 310 used by the cross link between BS 205a and UE 215b. The BS 205a may select a spatial subspace within the second spatial subspace for communicating with the UE 215a. For example, the BS 205a may select the spatial subspace 320 is orthogonal or pseudo-orthogonal to the cross link channel 234.

Figure 4:
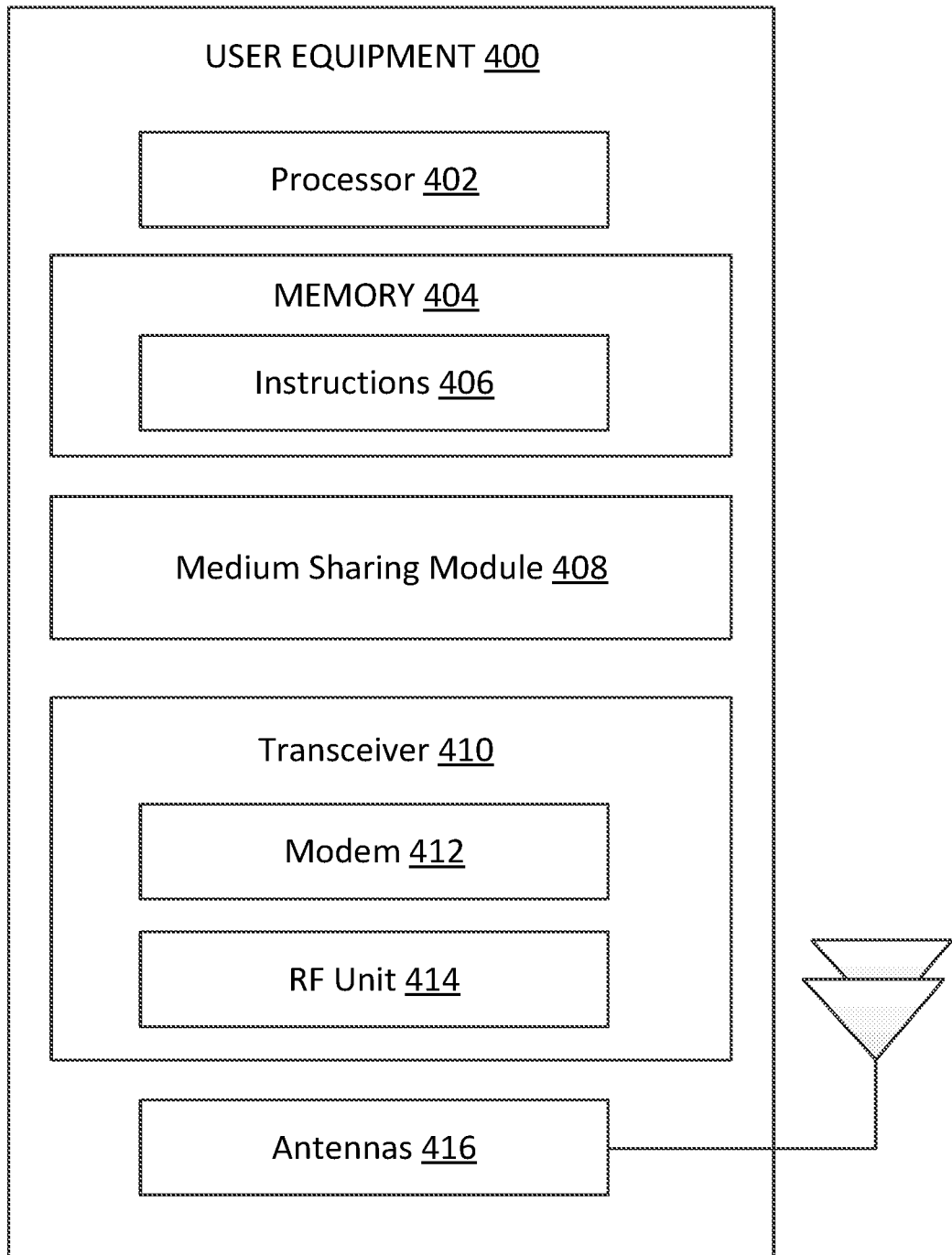
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to perform spatial LBT, transmit and/or receive reservation signals, determine random backoff counters for multiple spatial dimensions, and/or maintain one or more random backoff processes for spatial LBT, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404 and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215 or a BS 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may be similar to the antennas 220 and 222. This may include, for example, transmission of reservation signals, reservation response signals, and/or any communication signal according to embodiments of the present disclosure. The antennas 416 may further receive data messages transmitted from other devices. This may include, for example, reception of request-to-send (RTS) and/or CTS signals according to embodiments of the present disclosure. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
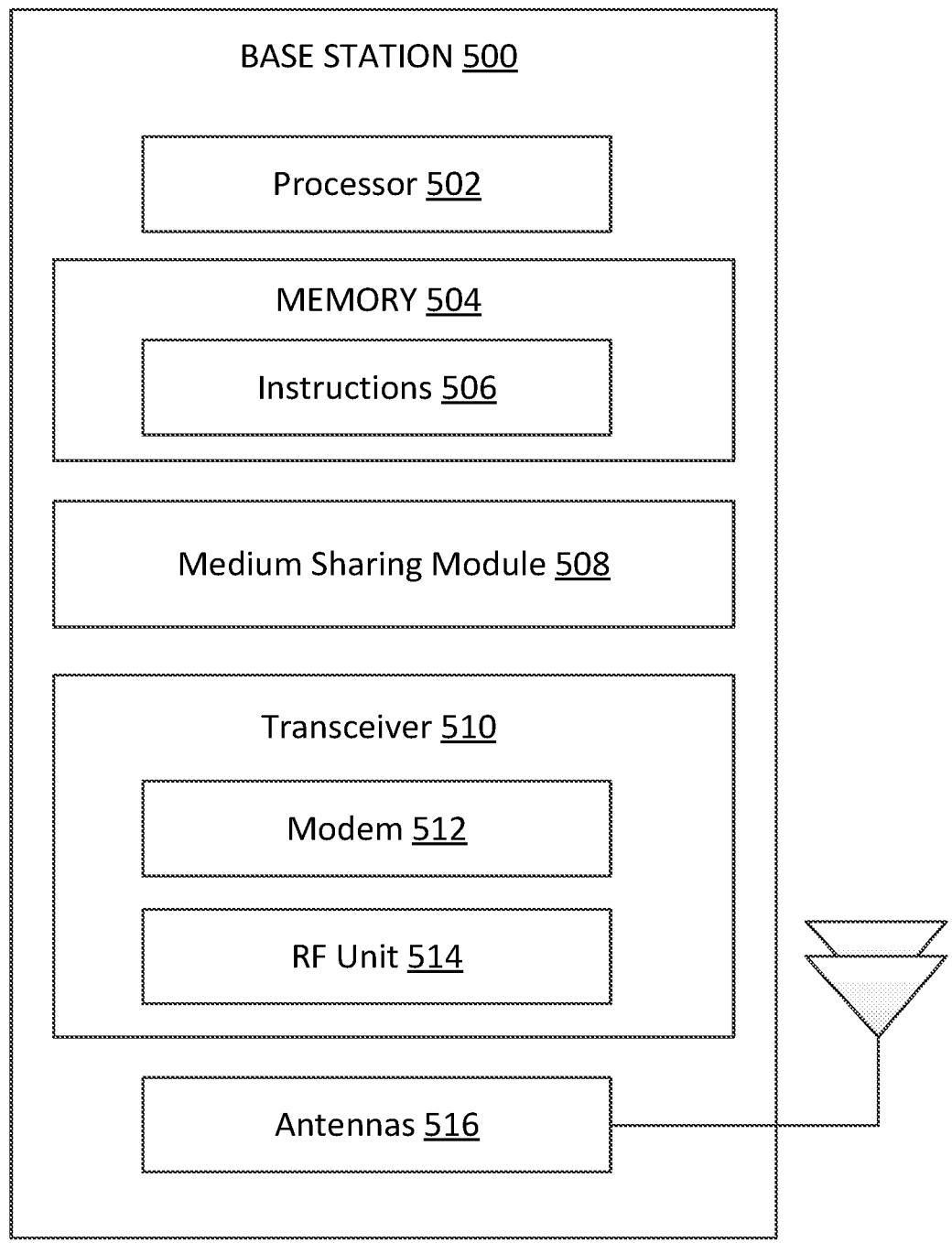
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The medium sharing module 508 may be implemented via hardware, software, or combinations thereof. For example, the medium sharing module 508 may be implemented as a processor, circuit, and/or instructions 506 stored in the memory 404 and executed by the processor 502. The medium sharing module 508 may be used for various aspects of the present disclosure. For example, the medium sharing module 508 is configured to perform spatial LBT, transmit and/or receive reservation signals, determine random backoff counters for multiple spatial dimensions, and/or maintain one or more random backoff processes for spatial LBT, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 205 to enable the BS 205 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may be similar to the antennas 220 and 222. This may include, for example, transmission of information to complete attachment to a network and communication with a camped UE 215 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
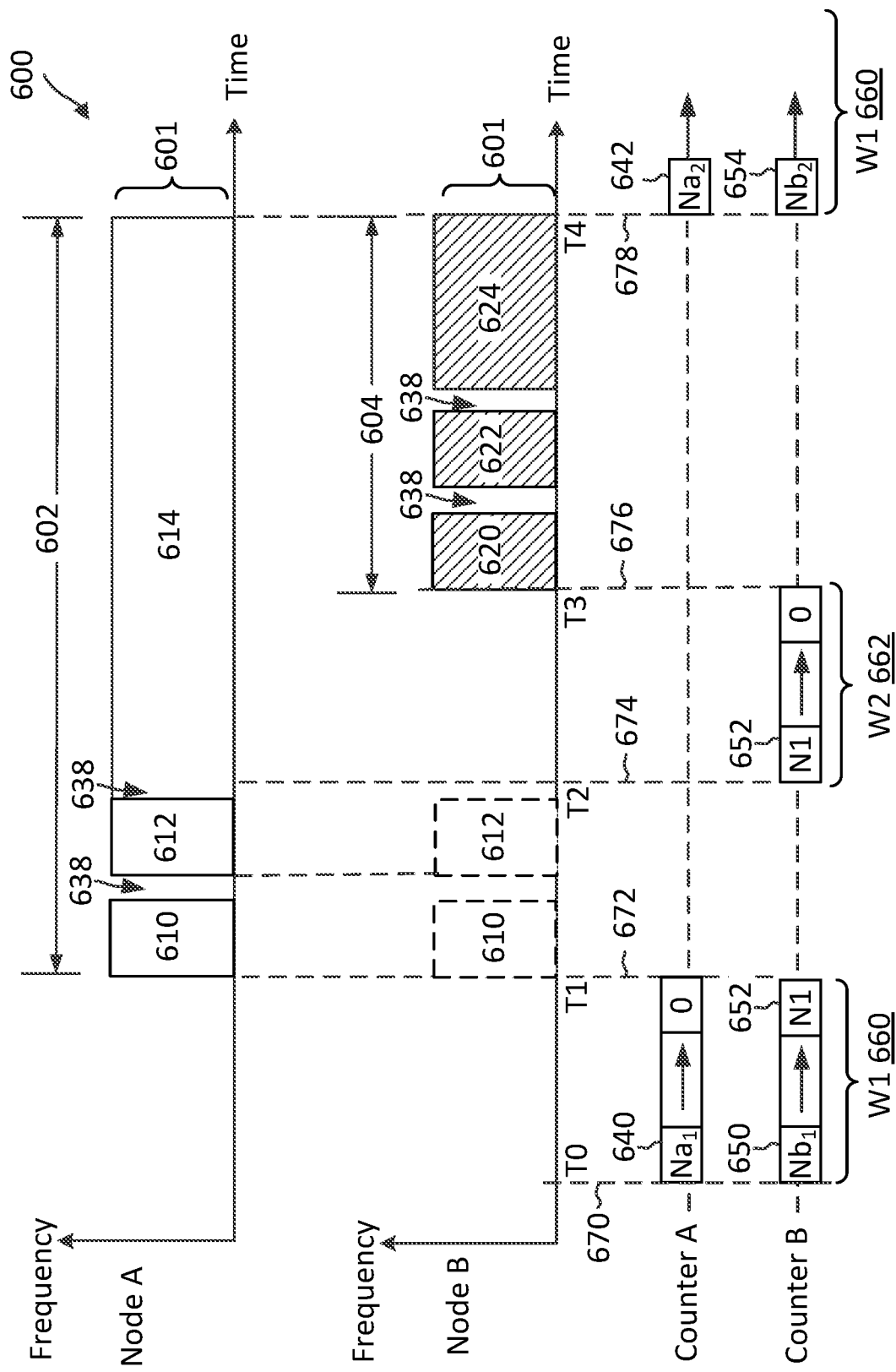
FIG. 6 illustrates a random backoff scheme using a single random backoff process for multiple spatial dimensions according to embodiments of the present disclosure.
Figure 7:
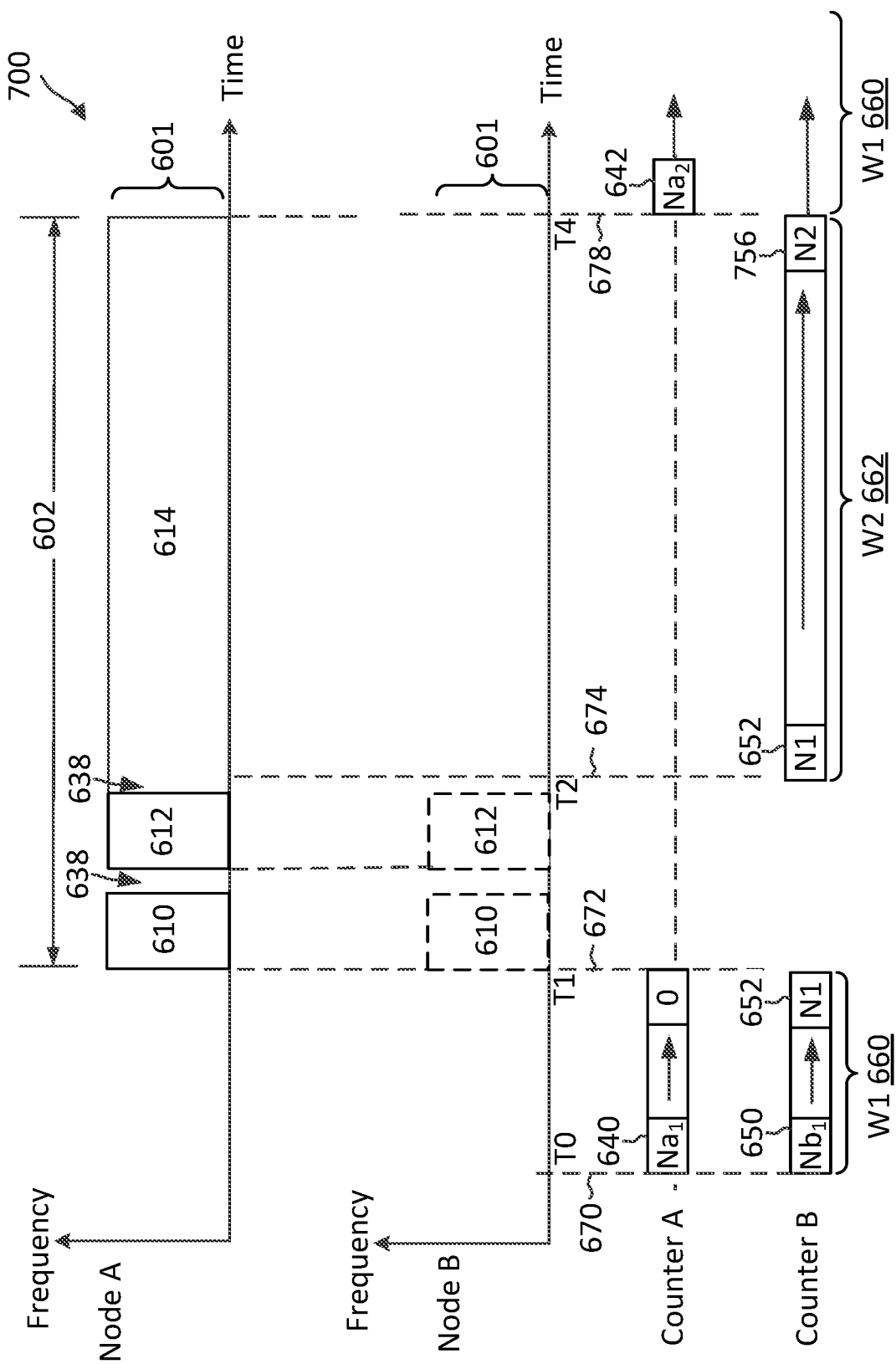
FIG. 7 illustrates a random backoff scheme using a single random backoff process for multiple spatial dimensions according to embodiments of the present disclosure.
Figure 8:
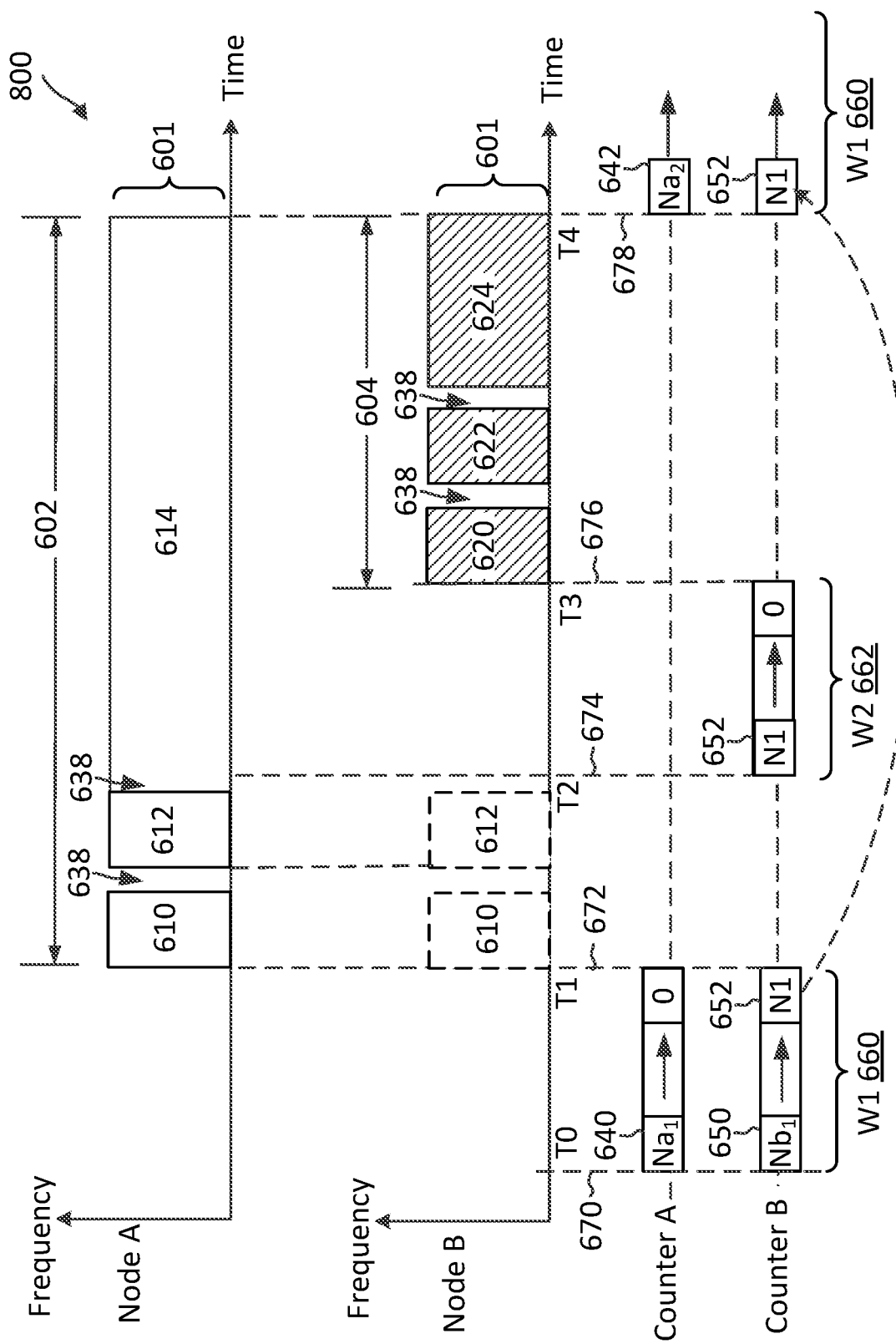
FIG. 8 illustrates a random backoff scheme using multiple random backoff processes for multiple spatial dimensions according to embodiments of the present disclosure.
Figure 9:
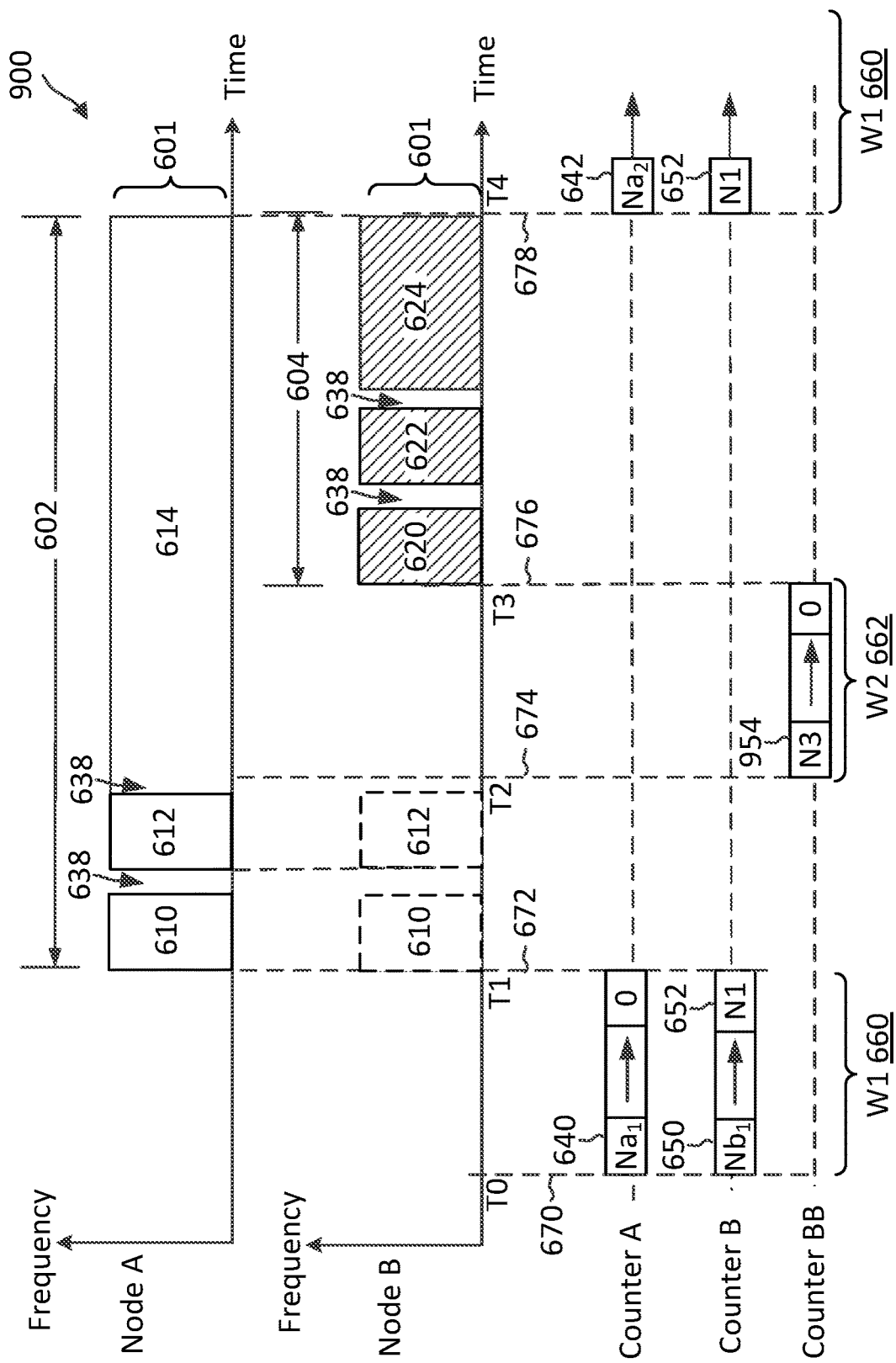
FIG. 9 illustrates a random backoff scheme using multiple random backoff processes for multiple spatial dimensions according to embodiments of the present disclosure.

FIGS. 6-9 illustrate various mechanisms for performing random backoff in spatial LBT. FIGS. 6 and 7 illustrate the use of a single random backoff process for all spatial subspaces. FIGS. 8 and 9 illustrate the use of multiple random backoff processes for multiple spatial subspaces. In FIGS. 6-9, the x-axes represent time in some constant units. The y-axes represent frequency in some constant units. The empty-filled boxes represent communications between a pair of transmit-receive nodes, for example, a node A and a first receiving node, where the node successfully gains access to a TXOP in a communication medium over a first spatial subspace. The pattern-filled boxes represent communications between a second pair of pair transmit-receiver nodes, for example, a node B and a second receiving, where the node B may not gain access to the TXOP over the first spatial subspace, but may gain access to a part of the first spatial subspace (e.g., a second spatial subspace). The dashed-outlined boxes represent detections by the node B. For example, the node A, the first receiving node, the node B, and the second receiving node may correspond to the BS 205b, the UE 215b, the BS 205a, and the UE 215a, respectively, in the network 200. The first receiving node and the second receiving node are not shown for purposes of simplicity of illustration.

FIG. 6 illustrates a random backoff scheme 600 using a single random backoff process for multiple spatial dimensions according to embodiments of the present disclosure. The scheme 600 may be employed by the BSs 105, 205, and 500 and the UEs 115, 215, and 400. In the scheme 600, the node A and the node B may contend for a TXOP 602 in a frequency spectrum 601. For random backoff, the node A may use a counter A and the node B may use a counter B. The counter A and the counter B may include hardware and/or software counters and/or timers. While the counters A and B are described in the context of count-down counters, in some other embodiments, the counters A and/or B may be alternatively configured to be count-up counters to achieve similar functionalities.

At time 670, denoted as T0, the node A selects a random backoff value 640, denoted as $Na_1$, for contending in a spatial subspace 660, denoted as W1, and initializes the counter A with the value 640. Similarly, the node B selects a random backoff value 650, denoted as $Nb_1$, for contending in the spatial subspace 660 and initializes the counter B with the value 650. The node A and/or the node B may select the spatial subspace 460 based on interference measurements. In some embodiments, the spatial subspace 660 may correspond to an omnidirectional space (e.g., the spatial subspace 330). The node A may select the value 640 based on a contention window size, for example, by drawing a value from a uniform distributor in an interval between 1 and the contention window size. The node B may use similar mechanisms to select the value 650. The node A and the node B may begin with a same initial contention window size (e.g., provided by an RRC configuration or consistent with the quality of service (QoS) of the traffic), but may each update the contention window size independently, as described in greater detail herein.

At time 672, denoted as T1, the counter A counts to completion (e.g., count down to 0). Thus, the node A transmits a reservation request signal 610 reserving the TXOP 602 for communication with the first receiving node. The reservation request signal 610 may be a request-to-send (RTS) signal. The reservation request signal 610 may include a predetermined signal sequence and/or scheduling information. The scheduling information may include a spatial subspace (e.g., number of spatial layers or a spatial dimension such as the spatial subspace 310) requested for the communication. In response, the node A receives a reservation response signal 612 from the first receiving node. The reservation response signal 612 may be a clear-to-send (CTS) signal. The reservation request signal 610 and/or the reservation response signal 612 may be communicated according to the spatial subspace to be used for a subsequent communication (e.g., a data signal 614) in the TXOP 602. After receiving the reservation response signal 612, the node A transmits the data signal 614 to the first receiving node in the requested or reserved spatial subspace.

Upon detecting an ongoing transmission (e.g., the reservation request signal 610 and/or reservation response signal 612) in the spatial subspace 660, the node B may switch to contend in a subspace of the spatial subspace 660, for example, a spatial subspace 662, shown as W2, and continue with the countdown. As shown, the counter B reaches a value 652, denoted as N1, at the time (e.g., at the time 672) when the node B detects the ongoing transmission of the node A.

At time 674, shown as T2, after receiving the reservation response signal 612, the node B configures the counter B to continue to count from the value 652 for a random backoff in the spatial subspace 662.

In some embodiments, the node B may detect the ongoing transmission based on an energy detection and/or a signal detection based on a predetermine sequence in the reservation request signal 610 and/or reservation response signal 612. The node B may determine a spatial subspace occupied by the ongoing transmission based on the reception of the ongoing transmission. The node B may determine the spatial subspace 662 by excluding the occupied spatial subspace from the spatial subspace 660.

At time 676, shown as T3, before the end of the TXOP 602, the counter B counts to completion (e.g., reaches a value of 0). Since there is no ongoing transmission detected in the spatial subspace 662, the node B may proceed to transmit a reservation request signal 620 to reserve a period 604 within the TXOP 602 for communication with the second receiving node. The node B may select a spatial subspace (e.g., the spatial channel 320) within the spatial subspace 662 for communicating with the second receiving node. In response, the node B receives a reservation response signal 622 from the second receiving node. The reservation request signal 620 and the reservation response signal 622 may be substantially similar to the reservation request signal 610 and the reservation response signal 612, respectively, but may be communicated in different spatial subspaces and/or carry different spatial information. After receiving the reservation response signal 622, the node B transmits a data signal 624 to the second receiving node using the determined spatial subspace. In the scheme 600, a time gap 638 is present when there is a transmit-to-receive or a receive-to transmit switching. The time gaps 638 allow time for a node to switch between receiving and transmitting.

At the end of the TXOP 602, for example, at time 678, shown as T4, the node A and the node B may return to perform spatial LBT in the spatial subspace 660. The node A and the node B may each select a new random value for contending in a next TXOP over the spatial subspace 660. For example, the node A selects a random backoff value 642, denoted as $Na_2$, and the node B selects a random backoff value 652, denoted as $Nb_2$. The node A may assign the value 642 to the counter A. The node B may assign the value 652 to the counter B.

In some embodiments, the spatial subspace switching may be repeated multiple times within a TXOP 602. For example, the node B may detect an ongoing transmission in the spatial subspace 662 during the TXOP 602, and thus may switch the spatial LBT to a subspace of the spatial subspace 662. In some embodiments, the node B may reduce a transmission power level as the spatial subspace reduces in spatial dimensions. For example, the node B may transmit at a lower transmission power level in the spatial subspace 662 than in the spatial subspace 660.

FIG. 7 illustrates a random backoff scheme 700 using a single random backoff process for multiple spatial dimensions according to embodiments of the present disclosure. The scheme 700 may be employed by the BSs 105, 205, and 500 and the UEs 115, 215, and 400. The scheme 700 is similar to the scheme 600, but illustrates a scenario when the counter B has not counted to completion at the end of the TXOP 602. As shown, at the time 678, the counter B has a non-zero value 756, denoted as N2. Since the node B did not gain access to any spatial subspace during the current TXOP 602, the node B may configure the counter B to continue to count from the value 756 for a random backoff before contending for the subsequent TXOP.

As can be seen from the schemes 600 and 700, when a node gain channel access in a current TXOP over any one of the spatial subspace, the node may select or redraw a new random backoff value for contending a subsequent TXOP. Conversely, when a node fails to gain channel access in a current TXOP over any spatial subspace, the node may continue or resume counting for contending subsequent TXOP.

FIG. 8 illustrates a random backoff scheme 800 using multiple random backoff processes for multiple spatial dimensions according to embodiments of the present disclosure. The scheme 800 may be employed by the BSs 105, 205, and 500 and the UEs 115, 215, and 400. The scheme 800 illustrates a similar scenario as in the scheme 600. However, the scheme 800 uses a separate random backoff process when switching to contend in a different spatial subspace. As shown, at time 674, upon detecting an ongoing transmission in the spatial subspace 660, the node B switches to contend in the spatial subspace 662. The node B configures the counter B based on a counter value of the counter B used for the spatial subspace 660. For example, the node B configures the counter B to continue to count from the value 652. The node B may save the counter value 652 from the counting in the spatial subspace 660 for a next TXOP. The random backoff counting in the spatial subspace 660 may be referred to as a parent backoff process and the random backoff counting in the spatial subspace 662 (e.g., a subspace of the spatial subspace 660) may be referred to as a child backoff process.

Similar to the scheme, at the time 676, when the counter B counts to completion or reaches a value of 0 before the end of the TXOP 602, the node B may communicate with the second receiving node in a period 604 within the TXOP 602.

At time 678, the node A and the node B may return to perform spatial LBT in the spatial subspace 660. The node A may select a new random value (e.g., the value 642) for contending in a subsequent TXOP. The node B may restore the last value 652 of the counter B from the parent backoff process and configure the counter B to count from the value 652 for contending for the subsequent TXOP.

In the scheme 800, when a node gain channel access in a current TXOP without overlaying on top of an ongoing transmission, the node may select or redraw a new random backoff value for contending a subsequent TXOP. Conversely, when a node fails to gain channel access in a current TXOP without overlaying on top of an ongoing transmission, the node may resume counting from a parent backoff process for contend a subsequent TXOP.

FIG. 9 illustrates a random backoff scheme 900 using multiple random backoff processes for multiple spatial dimensions according to embodiments of the present disclosure. The scheme 900 may be employed by the BSs 105, 205, and 500 and the UEs 115, 215, and 400. The scheme 900 is substantially similar to the scheme 800. For example, the scheme 900 uses a separate random backoff process when switching to contend in a different spatial subspace. However, in the scheme 900, a node may select or redraw a new random backoff value when the node switches to a spatial subspace, for example, from the spatial subspace 660 to the spatial subspace 662.

In the scheme 900, the node B may use two counters, a counter B for a random backoff (e.g., a parent backoff process) in the spatial subspace 660 and a counter BB for a random backoff (e.g., a child backoff process) in the spatial subspace 662. The node B may configure the counter B for the parent backoff process using similar mechanisms as in the scheme 700.

For the child backoff process in the spatial subspace 662, the node B selects a new random backoff value 954, shown as N3, for example, based on a contention window, and initializes the counter BB to the value 854. When the counter BB counts to completion or reaches a value of 0 before the end of the TXOP 602, the node B may communicate with the second receiving node in a period 604 within the TXOP 602 similar to the scheme 800.

While the schemes 800 and 900 illustrate one parent backoff process and one child backoff process for simplicity of discussion, the schemes 800 and 900 may include multiple levels of child backoff processes. For example, when the node B detects an ongoing transmission in the spatial subspace 662, the node B may switch the spatial LBT to a subspace of the spatial subspace 662.

In some embodiments, the contention window size may be initially configured by an RRC configuration or initially set based on the QoS of the traffic and subsequently updated based on a transmission error rate. In an embodiment, a node (e.g., the node A or the node B) may update the contention window size based on a transmission error rate in one or more spatial subspaces (e.g., the spatial subspaces 660 and 662).

In an embodiment, when a node employs the scheme 900, the node may use the same contention window size for all spatial subspaces and update the contention window size based on transmission error rates in one or more of the spatial subspaces. In another embodiment, when a node employs the scheme 900, the node may use a different contention window size for a different spatial subspace and update each contention window size based on a transmission error rate in a corresponding spatial subspace. For example, the node B may use a first contention window size and a second contention window size for the spatial subspaces 660 and 662, respectively. The node B may update the first contention window size and the second contention window size based on transmission error rates in the spatial subspaces 660 and 662, respectively.

In some embodiments, a node may switch spatial LBT to a different spatial subspace when the node detects an ongoing transmission (e.g., the reservation request signal 610 and/or the reservation response signal 612) in a current spatial subspace or when a network allocation vector (NAV) maintained by the node expires. The NAV may indicate an amount of time that a current ongoing transmission may occupy the channel.

Figure 10:
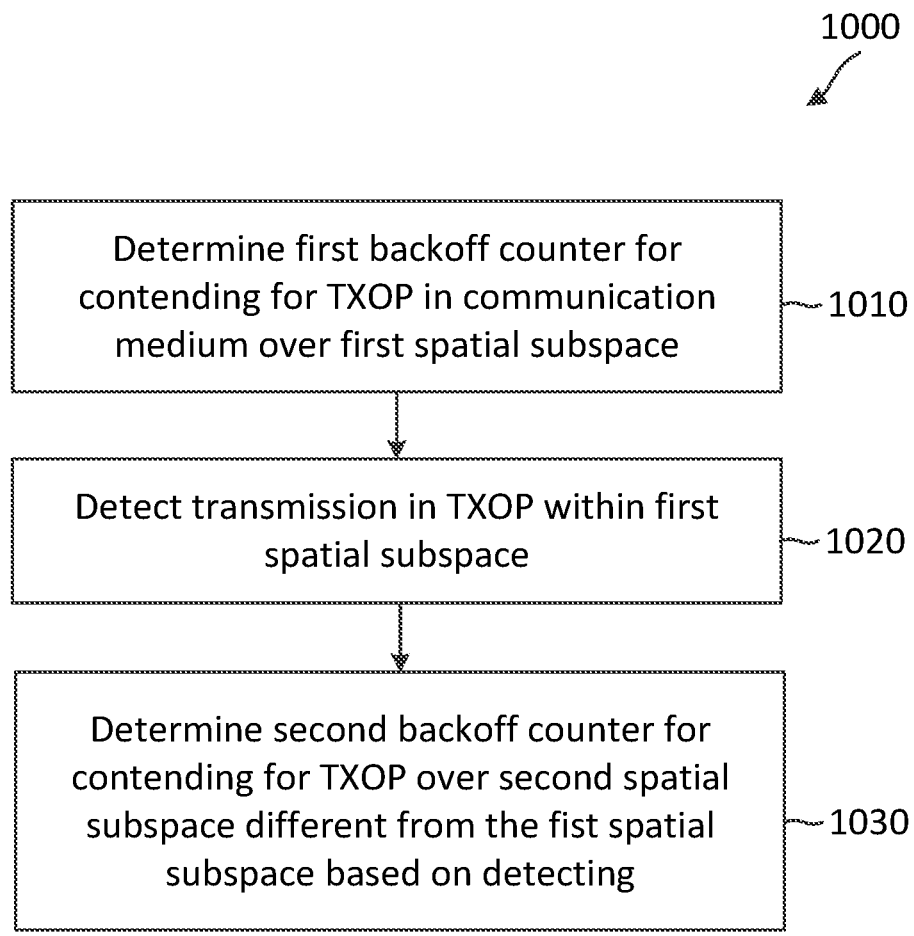
FIG. 10 is a flow diagram of a random backoff method for medium sharing in a spatial domain according to embodiments of the present disclosure.

FIG. 10 is a flow diagram of a random backoff method for medium sharing in a spatial domain according to embodiments of the present disclosure. Steps of the method 1000 can be executed by a computing device (e.g., a processor, processing circuit, and/or other suitable component) of a wireless communication device, such as the BSs 105, 205, and 500 and the UEs 115, 215, and 400. The method 1000 may employ similar mechanisms as in the schemes 600, 700, 800, and 900 described with respect to FIGS. 6, 7, 8, and 9, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order. In an embodiment, the wireless communication device may correspond to the node B.

At step 1010, the method 1000 includes determining a first backoff counter (e.g., the value 650) for contending for a TXOP (e.g., the TXOP 602) in a communication medium (e.g., the frequency spectrum 601) over a first spatial subspace (e.g., the spatial subspace 310, 320, and 330).

At step 1020, the method 1000 includes detecting a transmission (e.g., the reservation request signal 610 and/or the reservation response signal 612) in the TXOP within the first spatial subspace.

At step 1030, the method 1000 includes determining a second backoff counter (e.g., the value 652 and 954) for contending for the TXOP over a second spatial subspace that is different from the first spatial subspace based on the detecting. The second spatial subspace may be a part of the first spatial subspace. The detected transmission may be in a different spatial subspace than the second spatial subspace. For example, when the first spatial subspace corresponds to the spatial subspace 330 and the transmission is detected in the spatial subspace 310, the second spatial subspace may correspond to the spatial subspace 330 excluding the spatial subspace 310.

In an embodiment, the wireless communication device may assign, to the second backoff counter, a value (e.g., the value 652) of the first backoff counter when the transmission is detected. When the second backoff counter counts to completion within the TXOP, the wireless communication device may transmit a communication signal within the second spatial subspace to a second wireless communication device. The wireless communication device may determine a third backoff counter (e.g., the value 654) for contending for a subsequent TXOP in the communication medium over the first spatial subspace based on a contention window as shown in the scheme 600. Alternatively, when the second backoff counter has not counted to completion at an end of the TXOP, the wireless communication device may assign a value (e.g., the value 656) of the second backoff counter to a third backoff counter for contending for a subsequent TXOP in the communication medium over the first spatial subspace as shown in the scheme 700.

In an embodiment, the wireless communication device can determine the first backoff counter based on a first contention window and update the first contention window based on at least one of a transmission error rate in the first spatial subspace or a transmission error rate in the second spatial subspace.

In an embodiment, the wireless communication device can determine the first backoff counter based on a first contention window and determine the second backoff counter based on a second contention window. The first contention window and the second contention window can have the same window size or different window sizes. The wireless communication device can update the first contention window based on a transmission error rate in the first spatial subspace and update the second contention window based on a transmission error rate in the second spatial subspace.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising determining, by a first wireless communication device, a first backoff counter for contending for a transmission opportunity (TXOP) in a communication medium over a first spatial subspace; detecting, by the first wireless communication device, a transmission in the TXOP within the first spatial subspace; and determining, by the first wireless communication device, a second backoff counter for contending for the TXOP over a second spatial subspace that is different from the first spatial subspace based on the detecting.

In some embodiments, the second spatial subspace is part of the first spatial subspace, and wherein the detected transmission is in a different spatial subspace than the second spatial subspace. In some embodiments, the method further comprises transmitting, by the first wireless communication device to a second wireless communication device, a communication signal within the second spatial subspace when the second backoff counter has counted to completion within the TXOP; and determining, by the first wireless communication device, a third backoff counter for contending for a subsequent TXOP in the communication medium over the first spatial subspace based on a contention window. In some embodiments, the determining the second backoff counter includes assigning, to the second backoff counter, a value of the first backoff counter when the transmission is detected. In some embodiments, the second backoff counter has not counted to completion at an end of the TXOP, and wherein the method further comprises assigning, by the first wireless communication device, a value of the second backoff counter to a third backoff counter for contending for a subsequent TXOP in the communication medium over the first spatial subspace. In some embodiments, the determining the first backoff counter is based on a first contention window. In some embodiments, the method further comprises updating, by the first wireless communication device, the first contention windows based on at least one of a transmission error rate in the first spatial subspace and a transmission error rate in the second spatial subspace. In some embodiments, the determining the second backoff counter is based on a second contention window. In some embodiments, the first contention window and the second contention window are different. In some embodiments, the method further comprises updating, by the first wireless communication device, the first contention window based on a transmission error rate in the first spatial subspace; and updating, by the first wireless communication device, the second contention window based on a transmission error rate in the second spatial subspace. In some embodiments, the method further comprises assigning, by the first wireless communication device, a value of the first backoff counter when the transmission is detected to a third backoff counter for contending for a next TXOP in the communication medium over the first spatial subspace.

Further embodiments of the present disclosure include an apparatus comprising a processor configured to determine a first backoff counter for contending for a transmission opportunity (TXOP) in a communication medium over a first spatial subspace; detect a transmission in the TXOP within the first spatial subspace; and determine a second backoff counter for contending for the TXOP over a second spatial subspace that is different from the first spatial subspace based on the detection.

In some embodiments, the second spatial subspace is part of the first spatial subspace, and wherein the detected transmission is in a different spatial subspace than the second spatial subspace. In some embodiments, the apparatus further comprises a transceiver configured to transmit, to a second wireless communication device, a communication signal within the second spatial subspace when the second backoff counter has counted to completion within the TXOP, and wherein the processor is further configured to determine a third backoff counter for contending for a subsequent TXOP in the communication medium over the first spatial subspace based on a contention window. In some embodiments, the processor is further configured to determine the second backoff counter by assigning, to the second backoff counter, a value of the first backoff counter when the transmission is detected. In some embodiments, the second backoff counter has not counted to completion at an end of the TXOP, and wherein the processor is further configured to assign a value of the second backoff counter to a third backoff counter for contending for a subsequent TXOP in the communication medium over the first spatial subspace. In some embodiments, the processor is further configured to determine the first backoff counter is based on a first contention window. In some embodiments, the processor is further configured to update the first contention windows based on at least one of a transmission error rate in the first spatial subspace and a transmission error rate in the second spatial subspace. In some embodiments, the processor is further configured to determine the second backoff counter based on a second contention window. In some embodiments, the first contention window and the second contention window are different. In some embodiments, the processor is further configured to update the first contention window based on a transmission error rate in the first spatial subspace; and update the second contention window based on a transmission error rate in the second spatial subspace. In some embodiments, the processor is further configured to assign a value of the first backoff counter when the transmission is detected to a third backoff counter for contending for a next TXOP in the communication medium over the first spatial subspace.

Further embodiments of the present disclosure include a computer-readable medium having program code recorded thereon, the program code comprising code for causing a first wireless communication device to determine a first backoff counter for contending for a transmission opportunity (TXOP) in a communication medium over a first spatial subspace; code for causing the first wireless communication device to detect a transmission in the TXOP within the first spatial subspace; and code for causing the first wireless communication device to determine a second backoff counter for contending for the TXOP over a second spatial subspace that is different from the first spatial subspace based on the detection.

In some embodiments, the second spatial subspace is part of the first spatial subspace, and wherein the detected transmission is in a different spatial subspace than the second spatial subspace. In some embodiments, the computer-readable medium further comprises code for causing the first wireless communication device to transmit, to a second wireless communication device, a communication signal within the second spatial subspace when the second backoff counter has counted to completion within the TXOP; and code for causing the first wireless communication device to determine a third backoff counter for contending for a subsequent TXOP in the communication medium over the first spatial subspace based on a contention window. In some embodiments, the code for causing the first wireless communication device to determine the second backoff counter is further configured to assign, to the second backoff counter, a value of the first backoff counter when the transmission is detected. In some embodiments, the second backoff counter has not counted to completion at an end of the TXOP, and wherein the computer-readable medium further comprises code for causing the first wireless communication device to assign a value of the second backoff counter to a third backoff counter for contending for a subsequent TXOP in the communication medium over the first spatial subspace. In some embodiments, the code for causing the first wireless communication device to determine the first backoff counter is further configured to determine the first backoff counter based on a first contention window. In some embodiments, the computer-readable medium further comprises code for causing the first wireless communication device to update the first contention windows based on at least one of a transmission error rate in the first spatial subspace and a transmission error rate in the second spatial subspace. In some embodiments, the code for causing the first wireless communication device to determine the second backoff counter is further configured to determine the second backoff counter based on a second contention window. In some embodiments, the first contention window and the second contention window are different. In some embodiments, the computer-readable medium further comprises code for causing the first wireless communication device to update the first contention window based on a transmission error rate in the first spatial subspace; and code for causing the first wireless communication device to update the second contention window based on a transmission error rate in the second spatial subspace. In some embodiments, the computer-readable medium further comprises code for causing the first wireless communication device to assign a value of the first backoff counter when the transmission is detected to a third backoff counter for contending for a next TXOP in the communication medium over the first spatial subspace.

Further embodiments of the present disclosure include an apparatus comprising means for determining a first backoff counter for contending for a transmission opportunity (TXOP) in a communication medium over a first spatial subspace; means for detecting a transmission in the TXOP within the first spatial subspace; and means for determining a second backoff counter for contending for the TXOP over a second spatial subspace that is different from the first spatial subspace based on the detection.

In some embodiments, the second spatial subspace is part of the first spatial subspace, and wherein the detected transmission is in a different spatial subspace than the second spatial subspace. In some embodiments, the apparatus further comprises means for transmitting, to a second wireless communication device, a communication signal within the second spatial subspace when the second backoff counter has counted to completion within the TXOP; and means for determining a third backoff counter for contending for a subsequent TXOP in the communication medium over the first spatial subspace based on a contention window. In some embodiments, the means for determining the second backoff counter is further configured to assign, to the second backoff counter, a value of the first backoff counter when the transmission is detected. In some embodiments, the second backoff counter has not counted to completion at an end of the TXOP, and wherein the apparatus further comprises means for assigning a value of the second backoff counter to a third backoff counter for contending for a subsequent TXOP in the communication medium over the first spatial subspace. In some embodiments, the means for determining the first backoff counter is further configured to determine the first backoff counter based on a first contention window. In some embodiments, the apparatus further comprises means for updating the first contention windows based on at least one of a transmission error rate in the first spatial subspace and a transmission error rate in the second spatial subspace. In some embodiments, the means for determining the second backoff counter is further configured to determine the second backoff counter based on a second contention window. In some embodiments, the first contention window and the second contention window are different. In some embodiments, the apparatus further comprises means for updating the first contention window based on a transmission error rate in the first spatial subspace; and means for updating the second contention window based on a transmission error rate in the second spatial subspace. In some embodiments, the apparatus further comprises means for assigning a value of the first backoff counter when the transmission is detected to a third backoff counter for contending for a next TXOP in the communication medium over the first spatial subspace.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a first wireless communication device, a first backoff counter for contending for a transmission opportunity (TXOP) in a communication medium over a first spatial subspace, wherein the determining the first backoff counter is based on a first contention window;
   detecting, by the first wireless communication device, a transmission in the TXOP within the first spatial subspace; and
   determining, by the first wireless communication device, a second backoff counter for contending for the TXOP over a second spatial subspace that is different from the first spatial subspace based on the detecting, wherein the determining the second backoff counter is based on a second contention window.

2. The method of claim 1, wherein the second spatial subspace is part of the first spatial subspace, and wherein the detected transmission is in a different spatial subspace than the second spatial subspace.

3. The method of claim 1, further comprising:
   transmitting, by the first wireless communication device to a second wireless communication device, a communication signal within the second spatial subspace when the second backoff counter has counted to completion within the TXOP; and
   determining, by the first wireless communication device, a third backoff counter for contending for a subsequent TXOP in the communication medium over the first spatial subspace based on a contention window.

4. The method of claim 1, wherein the determining the second backoff counter includes assigning, to the second backoff counter, a value of the first backoff counter when the transmission is detected.

5. The method of claim 1, wherein the second backoff counter has not counted to completion at an end of the TXOP, and wherein the method further comprises assigning, by the first wireless communication device, a value of the second backoff counter to a third backoff counter for contending for a subsequent TXOP in the communication medium over the first spatial subspace.

6. The method of claim 1, further comprising:
updating, by the first wireless communication device, the first contention window based on at least one of a transmission error rate in the first spatial subspace or a transmission error rate in the second spatial subspace.

7. The method of claim 1, wherein the first contention window and the second contention window are different.

8. The method of claim 1, further comprising:
updating, by the first wireless communication device, the first contention window based on a transmission error rate in the first spatial subspace; and
updating, by the first wireless communication device, the second contention window based on a transmission error rate in the second spatial subspace.

9. The method of claim 1, further comprising:
assigning, by the first wireless communication device, a value of the first backoff counter when the transmission is detected to a third backoff counter for contending for a subsequent TXOP in the communication medium over the first spatial subspace.

10. An apparatus comprising:
a processor configured to:
determine a first backoff counter for contending for a transmission opportunity (TXOP) in a communication medium over a first spatial subspace based on a first contention window;
detect a transmission in the TXOP within the first spatial subspace; and
determine a second backoff counter for contending for the TXOP over a second spatial subspace that is different from the first spatial subspace based on the detection and
a second contention window.

11. The apparatus of claim 10, wherein the second spatial subspace is part of the first spatial subspace, and wherein the detected transmission is in a different spatial subspace than the second spatial subspace.

12. The apparatus of claim 10, further comprising a transceiver configured to transmit, to a second wireless communication device, a communication signal within the second spatial subspace when the second backoff counter has counted to completion within the TXOP, and wherein the processor is further configured to determine a third backoff counter for contending for a subsequent TXOP in the communication medium over the first spatial subspace based on a contention window.

13. The apparatus of claim 10, wherein the processor is further configured to determine the second backoff counter by assigning, to the second backoff counter, a value of the first backoff counter when the transmission is detected.

14. The apparatus of claim 10, wherein the second backoff counter has not counted to completion at an end of the TXOP, and wherein the processor is further configured to assign a value of the second backoff counter to a third backoff counter for contending for a subsequent TXOP in the communication medium over the first spatial subspace.

15. The apparatus of claim 10, wherein the processor is further configured to update the first contention window based on at least one of a transmission error rate in the first spatial subspace or a transmission error rate in the second spatial subspace.

16. The apparatus of claim 10, wherein the first contention window and the second contention window are different.

17. The apparatus of claim 10, wherein the processor is further configured to:
update the first contention window based on a transmission error rate in the first spatial subspace; and
update the second contention window based on a transmission error rate in the second spatial subspace.

18. The apparatus of claim 10, wherein the processor is further configured to assign a value of the first backoff counter when the transmission is detected to a third backoff counter for contending for a subsequent TXOP in the communication medium over the first spatial subspace.

19. A non-transitory computer-readable medium having program code recorded thereon, the program code comprising:
code for causing a first wireless communication device to determine a first backoff counter for contending for a transmission opportunity (TXOP) in a communication medium over a first spatial subspace based on a first contention window;
code for causing the first wireless communication device to detect a transmission in the TXOP within the first spatial subspace; and
code for causing the first wireless communication device to determine a second backoff counter for contending for the TXOP over a second spatial subspace that is different from the first spatial subspace based on the detection and based on a second contention window.

20. The non-transitory computer-readable medium of claim 19, wherein the second spatial subspace is part of the first spatial subspace, and wherein the detected transmission is in a different spatial subspace than the second spatial subspace.

21. The non-transitory computer-readable medium of claim 19, further comprising:
code for causing the first wireless communication device to transmit, to a second wireless communication device, a communication signal within the second spatial subspace when the second backoff counter has counted to completion within the TXOP; and
code for causing the first wireless communication device to determine a third backoff counter for contending for a subsequent TXOP in the communication medium over the first spatial subspace based on a contention window.

22. The non-transitory computer-readable medium of claim 19, wherein the code for causing the first wireless communication device to determine the second backoff counter is further configured to assign, to the second backoff counter, a value of the first backoff counter when the transmission is detected.

23. The non-transitory computer-readable medium of claim 19, wherein the second backoff counter has not counted to completion at an end of the TXOP, and wherein the computer-readable medium further comprises code for causing the first wireless communication device to assign a value of the second backoff counter to a third backoff counter for contending for a subsequent TXOP in the communication medium over the first spatial subspace.

24. The non-transitory computer-readable medium of claim 19, further comprising:
- code for causing the first wireless communication device to update the first contention window based on at least one of a transmission error rate in the first spatial subspace or a transmission error rate in the second spatial subspace.

25. The non-transitory computer-readable medium of claim 19, wherein the first contention window and the second contention window are different.

26. The non-transitory computer-readable medium of claim 19, further comprising:
- code for causing the first wireless communication device to update the first contention window based on a transmission error rate in the first spatial subspace; and
- code for causing the first wireless communication device to update the second contention window based on a transmission error rate in the second spatial subspace.

27. The non-transitory computer-readable medium of claim 19, further comprising:
- code for causing the first wireless communication device to assign a value of the first backoff counter when the transmission is detected to a third backoff counter for contending for a subsequent TXOP in the communication medium over the first spatial subspace.

* * * * *